Figure 1:
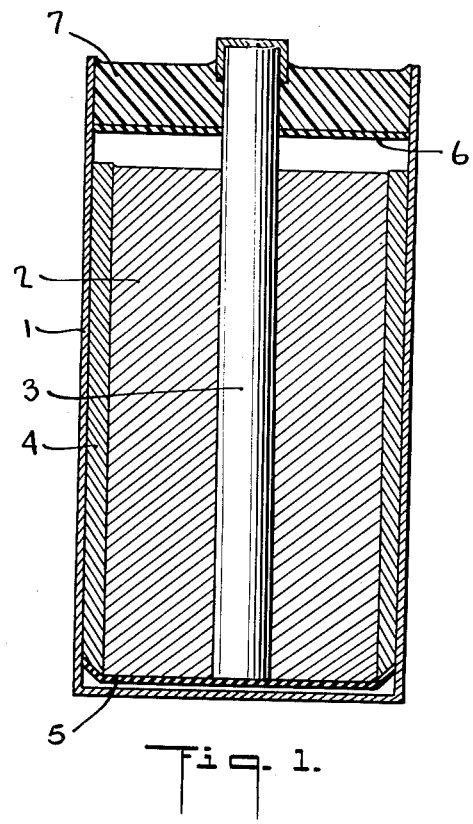

INVENTOR.
BODO PRIEBE

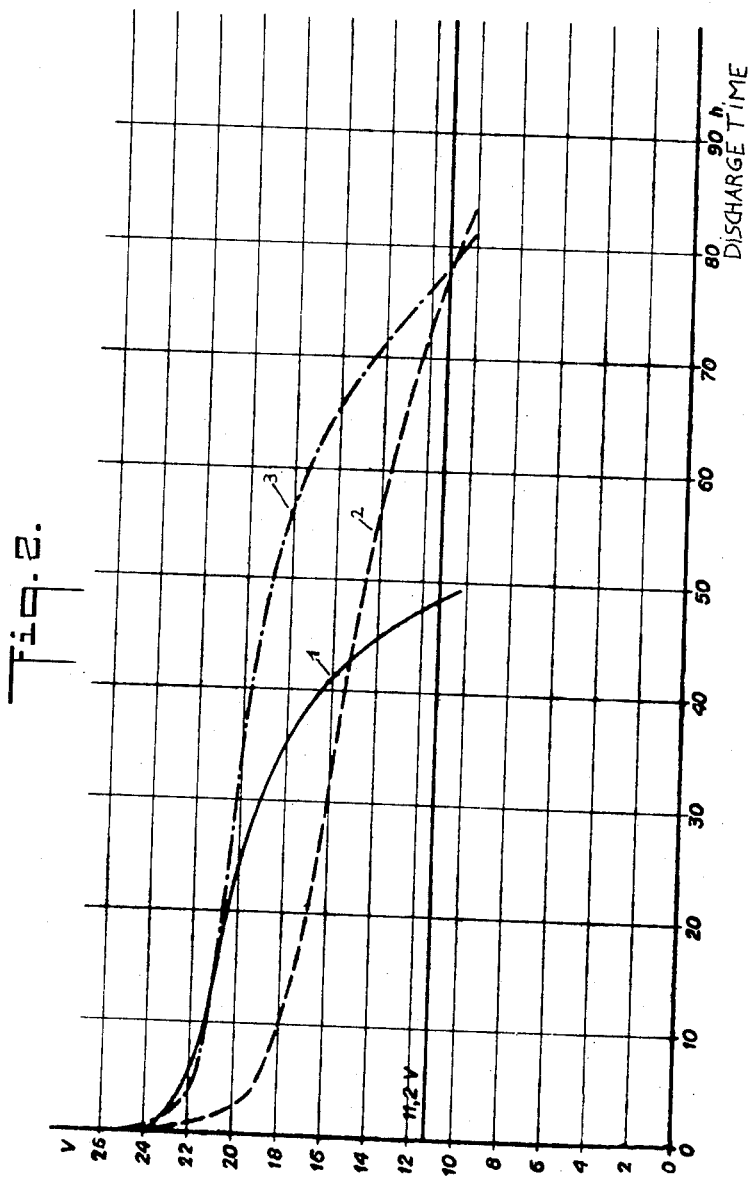

3,019,141
GALVANIC DRY CELL AND ELECTROLYTE THEREFOR

Bodo Priebe, Ellwangen an der Jagst, Germany, assignor to Pertrix-Union G.m.b.H., Ellwangen an der Jagst, Germany, a company of Germany
Filed Aug. 20, 1959, Ser. No. 835,040
Claims priority, application Germany Sept. 12, 1958
13 Claims. (Cl. 136—155)

The present invention relates to improvements in primary batteries and more particularly to an electrolyte for dry cells.

Galvanic dry cells are composed essentially of a soluble electrode, preferably of zinc, a depolarizer, a major portion of which is preferably of manganese dioxide, and an electrolyte.

It has been proposed to produce an electrolyte paste for dry cells, composed of a mixture of 50 parts of water, 50 parts of zinc chloride solution, and 5 parts to 8 parts of potato starch. These known zinc chloride electrolytes contained, however, only about 25%, by weight, of zinc chloride. Electrolyte pastes with a higher percentage of zinc chloride could not be produced because the conventional gelatinizing agents, such as flour or starch, so quickly thickened concentrated zinc chloride solutions that manufacture of dry cells with such electrolytes was impractical.

While it has been proposed to use zinc chloride solutions for wetting the depolarizing mix, the outer electrolyte has generally contained zinc chloride only in conjunction with a major amount of ammonium chloride. Known electrolyte compositions are composed, for instance, of 23 parts of ammonium chloride, 12 parts of zinc chloride, and 65 parts of water; or 26 parts of ammonium chloride, 8.8 parts of zinc chloride, and 65.2 parts of water.

It has been assumed that pure zinc chloride solutions could not be used as inner and outer electrolyte, i.e., for wetting the depolarizing mix and for preparing the electrolyte paste, because of the relatively high electric resistance of pure zinc chloride solutions in comparison to that of ammonium or calcium chloride solutions.

It is the primary object of the present invention to produce dry cells with a high electrical output. More particularly, it is an object of this invention to provide dry cells the working voltage of which during a given discharge time is considerably higher and during an extended operating time is more even than in comparable magnesium chloride cells while their working voltage falls much less rapidly and their discharge time is accordingly much longer than in comparable cells with ammonium chloride electrolytes.

The above and other objects are accomplished in accordance with the invention by providing an inner and outer electrolyte comprising a zinc chloride solution containing at least 40% and at most 75%, preferably between 50% and 60%, by weight, of zinc chloride, the outer electrolyte paste containing carob bean flour as a gelatinizing agent. It has been found that only the use of carob bean flour as a gelatinizing agent makes it possible to prepare an electrolyte paste with concentrated zinc chloride solutions.

Because of their extended discharge time at constant voltages, dry cells with the novel electrolyte according to the present invention are particularly useful in transistor devices.

Throughout the specification and the claims, the "outer" electrolyte designates the electrolyte paste conventionally positioned between the anode and the cathode of a dry cell while the electrolyte solution wetting the depolarizer mix is designated as the "inner" electrolyte.

According to the present invention, the electrolyte paste constituting the outer electrolyte comprises from 40 to 75%, by weight, of $ZnCl_2$, from 0.2 to 3.0%, by weight, of carob bean flour, 59.8 to 22% by weight of water.

In a preferred embodiment, the outer electrode comprises 0.5–1.5%, by weight, of carob bean flour and 0.2 to 0.5%, by weight, of mercuric chloride.

According to a preferred embodiment of the present invention a depolarizer mix containing from 20% to 35%, by weight, based on the weight of the dry mix, of artificial manganese dioxide is used. The use of the artificial oxide in conjunction with the zinc chloride electrolyte and the carob bean flour gelatinizing agent produces a particularly high electrical output of the dry cells. Conventional sal ammoniac cells with such a high proportion of artificial oxide in their depolarizer have an unsatisfactorily short shelf life because the high activity of the artificial oxide and its high solubility in the sal ammoniac electrolyte leads to rapid destruction of the cell due to self-discharge. But the use of a pure zinc chloride solution of high concentration produces such a high zinc ion content that the corrosion of the zinc anode is so strongly reduced that the shelf life of the novel battery according to the present invention is equal to that of the conventional magnesium chloride cells. Also the solubility of artificial manganese dioxide in zinc chloride solutions is as small as in magnesium chloride solutions and thus considerably smaller than in ammonium chloride solutions.

The present invention will be more fully understood by reference to the following detailed description of a specific embodiment thereof, as illustrated in the accompanying drawing, but it is in no way limited thereby. In the drawing, FIG. 1 shows a vertical cross-section of a generally conventional flashlight dry cell and FIG. 2 is a graph illustrating the technical advantages of using an electrolyte according to the present invention in a dry cell.

Referring now to the drawing, the cell is shown to comprise zinc can or cup 1 which serves as anode and as a container for the cell. It holds the bobbin of depolarizing mix 2 with its central carbon rod 3 embedded in the mix and constituting an electric current collector and conductor. The interspace between zinc cup 1 and bobbin 2 is filled by a separator wall 4 constituted by the outer electrolyte paste of this invention. The depolarizer rests on bottom disc or washer 5, the top collar 6 which may be an impregnated cardboard washer serving as a centering means for rod 3 and also as a support for the top seal 7. The seal may be wax or pitch poured while hot and subsequently torched to improve the bond between the zinc cup surface and the sealing material.

The structure of the illustrated dry cell is conventional.

The curves in the graph of FIG. 2 illustrate the advantage of the new electrolyte over prior art electrolytes, curve 1 showing the discharge of a plate battery of 22.5 volts with an ammonium chloride electrolyte, curve 2 plotting the discharge of such a battery with a magnesium chloride electrolyte, and curve 3 illustrating its discharge with a zinc chloride electrolyte according to the present invention. The batteries were discharged daily for eight hours through 2.1 k-ohms.

As can be seen, the electrical output of the ammonium chloride cell falls rather rapidly, being below 11.2 volts in less than 50 hours. While the effective discharge time of the magnesium chloride battery is the same as that of the zinc chloride cell, according to the present invention, a comparison between curves 2 and 3 shows that the zinc chloride cell maintains a considerably higher voltage.

By way of example, a cylindrical flashlight dry cell, as illustrated in FIG. 1, with the following outer electrolyte composition has been produced:

> 55 parts of zinc chloride
> 45 parts of water
> 0.3 part of mercuric chloride
> 1 part of carob bean flour The depolarizing mix had the following composition:

> 60 parts of natural manganese dioxide
> 30 parts of artificial manganese dioxide
> 10 parts of acetylene black
> 40 parts of zinc chloride solution, containing 50% by weight $ZnCl_2$ and 50% $H_2O$ The invention may, of course, be applied with equal success to other types of dry cells having preferably a soluble zinc electrode and a manganese dioxide-base depolarizer, i.e., flat cells, paper lined cells, and the like.

While the dry cell of the present invention has been described in connection with certain specific embodiments thereof, it will be clearly understood that many modifications and variations may occur to the skilled in the art, particularly after benefiting from the present teaching, without departing from the spirit and scope of the invention as defined in the appended claims.

I claim:

1. A galvanic dry cell having a soluble metal electrode, a depolarizer wetted with an electrolyte solution constituting an inner electrolyte, and an outer electrolyte paste, the inner and outer electrolyte consisting essentially of a zinc chloride solution of at least about 40%, by weight, of zinc chloride and the outer electrolyte also containing carob bean flour as a gelatinizing agent to thicken the solution to a pasty consistency.

2. The dry cell of claim 1, wherein the zinc chloride solution contains from about 40% to 60%, by weight, of zinc chloride.

3. The dry cell of claim 1, wherein the zinc chloride solution contains at least about 50%, by weight, of zinc chloride.

4. The dry cell of claim 1, wherein the outer electrolyte contains from about 0.2% to 3.0%, by weight, of carob bean flour.

5. The dry cell of claim 4, wherein the outer electrolyte contains from 0.5% to 1.5%, by weight, of carob bean flour and from 0.2% to 0.5%, by weight, of mercuric chloride.

6. A galvanic dry cell having a soluble zinc electrode, a depolarizer containing from about 20% to 35%, by weight, based on the weight of the dry depolarizer mix, of artificial manganese dioxide, said depolarizer being wetted with an electrolyte solution constituting an inner electrolyte, and an outer electrolyte paste separating the zinc electrode and the depolarizer, the inner and outer electrolyte consisting essentially of a zinc chloride solution of at least about 40%, by weight, of zinc chloride and the outer electrolyte also containing carob bean flour as a gelatinizing agent to thicken the solution to a pasty consistency.

7. The galvanic dry cell of claim 6, wherein the zinc chloride solution contains from about 50% to 60%, by weight, of zinc chloride.

8. The galvanic dry cell of claim 6, wherein the outer electrolyte contains from about 0.5% to about 1.5%, by weight, of carob bean flour and from about 0.2% to about 0.5%, by weight, of mercuric chloride.

9. An electrolyte solution for a galvanic dry cell having a soluble metal electrode, a depolarizer wetted with said electrolyte solution, and a carbon rod electric current conductor and collector embedded in said depolarizer, said electrolyte solution consisting essentially of a zinc chloride solution of at least about 40%, by weight, of zinc chloride and containing carob bean flour as a gelatinizing agent to thicken the electrolyte solution to a pasty consistency.

10. The electrolyte solution of claim 9, wherein the zinc chloride solution contains from about 40% to about 60%, by weight, of zinc chloride.

11. The electrolyte solution of claim 10, wherein the zinc chloride solution contains at least about 50%, by weight, of zinc chloride.

12. The electrolyte solution of claim 10, wherein the electrolyte solution contains from about 0.2% to about 3.0%, by weight, of carob bean flour.

13. The electrolyte solution of claim 12, wherein the electrolyte solution contains from 0.5% to 1.5%, by weight, of carob bean flour and from 0.2% to 0.5%, by weight, of mercuric chloride.

References Cited in the file of this patent

UNITED STATES PATENTS

| | | |
|---|---|---|
| 2,667,405 | Muller et al. | Jan. 26, 1954 |
| 2,885,262 | Fleischer et al. | May 5, 1959 |
| 2,903,498 | Sindel et al. | Sept. 8, 1959 |
| 2,906,802 | Andre | Sept. 29, 1959 |

FOREIGN PATENTS

| | | |
|---|---|---|
| 808,062 | Great Britain | Jan. 28, 1959 |